United States Patent
Okuma et al.

(10) Patent No.: US 10,493,885 B2
(45) Date of Patent: Dec. 3, 2019

(54) REINFORCEMENT STRUCTURE FOR SEAT BACK FRAME

(71) Applicant: TS TECH CO., LTD., Asaka-shi, Saitama (JP)

(72) Inventors: Kei Okuma, Shioya-gun (JP); Naoya Nishimoto, Shioya-gun (JP); Yuta Sugaya, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 155 days.

(21) Appl. No.: 15/715,857

(22) Filed: Sep. 26, 2017

(65) Prior Publication Data

US 2018/0272907 A1 Sep. 27, 2018

(30) Foreign Application Priority Data

Mar. 23, 2017 (JP) ................................. 2017-056951

(51) Int. Cl.
*B60N 2/68* (2006.01)
(52) U.S. Cl.
CPC .................... *B60N 2/686* (2013.01)
(58) Field of Classification Search
CPC .......... B60N 2/68; B60N 2/686; B60N 2/682; A47C 3/12
USPC ............. 297/452.12, 452.14, 452.31, 452.18
See application file for complete search history.

(56) References Cited

U.S. PATENT DOCUMENTS

| | | | | | |
|---|---|---|---|---|---|
| 811,259 | A * | 1/1906 | Taylor | .................... | B60N 2/686 297/452.55 |
| 2,390,761 | A * | 12/1945 | Watter | ..................... | B64C 3/00 244/124 |
| 2,427,853 | A * | 9/1947 | Goodlett | .................. | B64C 3/00 244/123.2 |
| 2,931,427 | A * | 4/1960 | Goldstein | ................ | A47C 7/16 297/452.43 |
| 3,411,824 | A * | 11/1968 | White | ...................... | B60N 2/68 267/102 |
| 3,694,030 | A * | 9/1972 | Grosfillex | ............... | A47C 3/12 297/448.1 |
| 3,823,518 | A * | 7/1974 | Allen | ..................... | B61D 17/12 52/309.3 |
| 3,856,350 | A * | 12/1974 | Duke | .................... | A47C 1/026 297/329 |

(Continued)

FOREIGN PATENT DOCUMENTS

EP 1634765 A2 * 3/2006 ............ B60N 2/686
JP S54-75212 U 5/1979

(Continued)

OTHER PUBLICATIONS

Dec. 5, 2017 International Search Report issued in International Patent Application No. PCT/JP2017-034333.

(Continued)

*Primary Examiner* — Kyle J. Walraed-Sullivan
(74) *Attorney, Agent, or Firm* — Oliff PLC

(57) ABSTRACT

A reinforcement structure for a seat back frame includes a panel member and a frame member joined to the panel member. The panel member includes an outer peripheral flange formed by bending an outer peripheral portion of the panel member, and the outer peripheral flange includes a plurality of outer peripheral beads formed thereon and arranged at intervals in a circumferential direction of the panel member.

18 Claims, 8 Drawing Sheets

(56) References Cited

U.S. PATENT DOCUMENTS

| | | | | |
|---|---|---|---|---|
| 3,940,183 A * | 2/1976 | Seltzer | A47C 7/74 | 297/452.45 |
| 4,205,880 A * | 6/1980 | Trotman | A47C 7/021 | 297/452.45 |
| 4,313,640 A * | 2/1982 | Trotman | A47C 7/742 | 297/452.45 |
| 4,502,731 A * | 3/1985 | Snider | A47C 7/024 | 297/452.15 |
| 4,679,848 A * | 7/1987 | Spierings | A47C 7/425 | 297/230.14 |
| 4,685,739 A * | 8/1987 | Deegener | A47C 7/40 | 297/452.65 |
| 4,744,603 A * | 5/1988 | Knoblock | A47C 1/03255 | 297/285 |
| 4,749,231 A * | 6/1988 | Cremer | B60N 2/686 | 297/468 |
| 5,249,841 A * | 10/1993 | Chales | A47C 7/40 | 297/452.18 |
| 5,285,615 A * | 2/1994 | Gilmour | E04B 2/7412 | 52/781 |
| 5,442,885 A * | 8/1995 | Laven | E04C 3/07 | 29/453 |
| 6,446,945 B1 * | 9/2002 | Wisniewski | B60N 2/7094 | 267/105 |
| 8,029,066 B2 * | 10/2011 | Su | A47C 31/023 | 297/440.11 |
| 8,573,697 B1 * | 11/2013 | Su | A47C 7/462 | 297/284.7 |
| 8,998,316 B2 * | 4/2015 | Naughton | B60N 2/686 | 297/216.13 |
| 10,182,657 B2 * | 1/2019 | Beyer | B68G 5/00 | |
| 2002/0149252 A1 * | 10/2002 | Fourrey | B60N 2/64 | 297/452.2 |
| 2003/0062759 A1 * | 4/2003 | Gupta | B60N 2/3013 | 297/452.65 |
| 2004/0100139 A1 * | 5/2004 | Williams | A47C 7/405 | 297/452.31 |
| 2004/0183356 A1 * | 9/2004 | Philippot | B60N 2/70 | 297/452.18 |
| 2006/0175887 A1 * | 8/2006 | Behrens | B60N 2/68 | 297/452.18 |
| 2007/0169429 A1 * | 7/2007 | Wu | A47B 85/00 | 52/405.4 |
| 2007/0278842 A1 * | 12/2007 | Ikai | B60N 2/682 | 297/452.14 |
| 2008/0006002 A1 * | 1/2008 | Strickland | E04C 3/07 | 52/843 |
| 2008/0084105 A1 * | 4/2008 | Behrens | B60N 2/5816 | 297/452.55 |
| 2008/0277987 A1 * | 11/2008 | Deadrick | B60N 2/686 | 297/352 |
| 2009/0314892 A1 * | 12/2009 | Kunichi | B21J 15/14 | 244/123.1 |
| 2010/0072799 A1 * | 3/2010 | Peterson | A47C 3/12 | 297/285 |
| 2011/0127823 A1 * | 6/2011 | Behrens | B60N 2/686 | 297/452.55 |
| 2011/0147522 A1 * | 6/2011 | Williams | B64C 3/187 | 244/123.1 |
| 2011/0148173 A1 * | 6/2011 | Westerink | B60N 2/24 | 297/452.18 |
| 2011/0285189 A1 * | 11/2011 | Petzel | B60N 2/56 | 297/284.1 |
| 2012/0062014 A1 * | 3/2012 | Walker | A47C 7/42 | 297/452.29 |
| 2013/0020852 A1 * | 1/2013 | Corcoran | B60N 2/2222 | 297/452.18 |
| 2015/0008716 A1 * | 1/2015 | Dry | B60N 2/90 | 297/452.18 |
| 2015/0175038 A1 * | 6/2015 | Kaneda | B60N 2/682 | 297/378.12 |
| 2016/0368406 A1 * | 12/2016 | Pluta | B60N 2/64 | |
| 2017/0028888 A1 * | 2/2017 | Seibold | B60N 2/643 | |
| 2017/0313223 A1 * | 11/2017 | Tomita | B60N 2/809 | |
| 2018/0126885 A1 * | 5/2018 | Hartmann | B60N 2/682 | |
| 2018/0126886 A1 * | 5/2018 | Line | B60N 2/80 | |
| 2018/0272907 A1 * | 9/2018 | Okuma | B60N 2/686 | |
| 2019/0084457 A1 * | 3/2019 | Okuma | B60N 2/90 | |

FOREIGN PATENT DOCUMENTS

| | | |
|---|---|---|
| JP | H09-011783 A | 1/1997 |
| JP | 2001-61593 A | 3/2001 |
| JP | 2002-316566 A | 10/2002 |
| JP | 2008-67724 A | 3/2008 |
| JP | 2011-518071 A | 6/2011 |
| JP | 2011-246067 A | 12/2011 |
| JP | 4859195 B2 | 1/2012 |

OTHER PUBLICATIONS

Dec. 5, 2017 International Search Opinion issued in International Patent Application No. PCT/JP2017-034333.

Apr. 23, 2019 Office Action issued in Japanese Patent Application No. 2017-056951.

* cited by examiner

REINFORCEMENT STRUCTURE FOR SEAT BACK FRAME

BACKGROUND OF THE INVENTION

1. Field of the Invention

The present invention relates to a reinforcement structure for a seat back frame in a vehicle seat.

2. Description of the Related Art

Conventionally, for example, Japanese Patent No. 4859195 discloses a seat back frame of a vehicle seat including a panel member formed of a substantially rectangular metal plate and a frame member formed in a frame shape and joined to a panel frame.

In a region of the panel member where the frame member is not provided, a plurality of beads is formed by bulging the metal plate into elongated protrusions, and reinforcement using the beads is performed.

However, although the frame member is joined to the panel member in a conventional seat back frame in the vicinity of the outer peripheral portion of the panel member, the outer peripheral portion itself is not reinforced. Therefore, the rigidity of the entire seat back frame may not be sufficient.

SUMMARY OF THE INVENTION

An object of the present invention is to improve the rigidity of the entire seat back frame by improving the rigidity of the outer peripheral portion of the panel member.

According to a first aspect of the present invention, there is provided a reinforcement structure for a seat back frame including:

a panel member; and a frame member joined to the panel member, wherein the panel member includes an outer peripheral flange formed by bending an outer peripheral portion of the panel member, and the outer peripheral flange includes a plurality of outer peripheral beads formed thereon and arranged at intervals in a circumferential direction of the panel member.

BRIEF DESCRIPTION OF THE DRAWINGS

The object, advantages and features of the present invention described above will be more fully understood from the following detailed description and the accompanying drawings. However, these are not intended to limit the present invention, wherein.

DETAILED DESCRIPTION OF EMBODIMENTS

Hereinafter, embodiments of the present invention will be described with reference to the drawings. Although various technically preferable limitations for implementing the present invention are given to the embodiments described below, the technical scope of the present invention is not limited to the following embodiments and illustrated examples.

Figure 1:
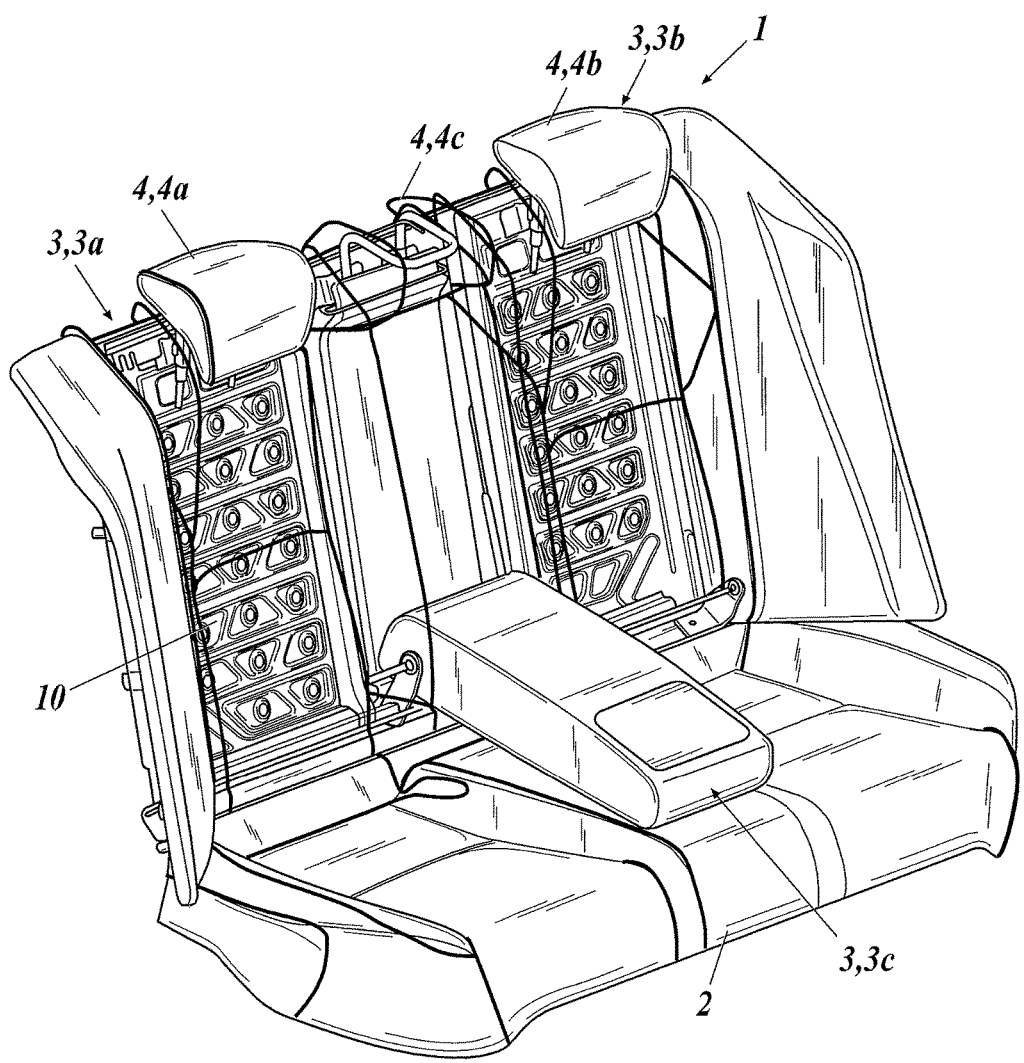
FIG. 1 is a perspective view of a vehicle seat provided with a seat back frame.
Figure 1:
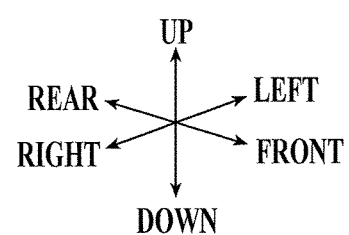

FIG. 1 illustrates a vehicle seat 1 provided in a room of an automobile (vehicle), and the vehicle seat 1 of the present embodiment is a rear seat for three occupants. Note that in FIG. 1, a part of a cushion portion of a seat back 3 and a cushion portion of a headrest 4 (4c) provided on a center seat are displayed in a silhouette.

Note that in the present embodiment, various descriptions are given on the basis of the direction in the state where the vehicle seat 1 is provided in the vehicle.

The vehicle seat 1 includes a seat cushion 2 for supporting buttocks of respective occupants when three people are seated and the seat back 3 provided in a standing state at a rear end portion of the seat cushion 2 and serving as a backrest for each occupant.

The seat cushion 2 and the seat back 3 are formed such that irregularities are present in a cushion material provided inside a surface material and seams of the surface material correspond to boundaries between the irregularities, and thus constitute a seating region for three people.

In the seat back 3, a seating region is divided into a right seat back 3a, a left seat back 3b, and a center seat back 3c, and upper portions of the respective seat backs 3a, 3b, and 3c are provided with headrests 4 (4a, 4b, and 4c) for supporting heads of respective occupants.

The entire seat back 3 is configured such that the angle thereof with respect to the seat cushion 2 can be adjusted by a reclining mechanism (not shown). Via the reclining mechanism, the seat back 3 can be reclined forward and backward, and a locked state in which the angle of the seat back 3 is retained can be established.

Apart from the reclining mechanism, the center seat back 3c can be inclined forward about a rotation axis provided at a lower end portion thereof. As a result, the center seat back 3c functions as an armrest that can be used from the left and right seat backs 3a and 3b in a state in which the center seat back 3c is completely reclined forward as shown in FIG. 1.

In addition, the seat back 3 includes a seat back frame 10 as a framework, and the seat back frame 10 includes a panel member 20 and a frame member 30 joined to the panel member 20.

More specifically, the seat back 3 is configured by providing a cushion material on the seat back frame 10 and further covering the cushion material with a surface material. Further, the above-described reclining mechanism is coupled to the seat back frame 10. The seat back frame 10 constitutes three rows of seat backs.

Figure 2:
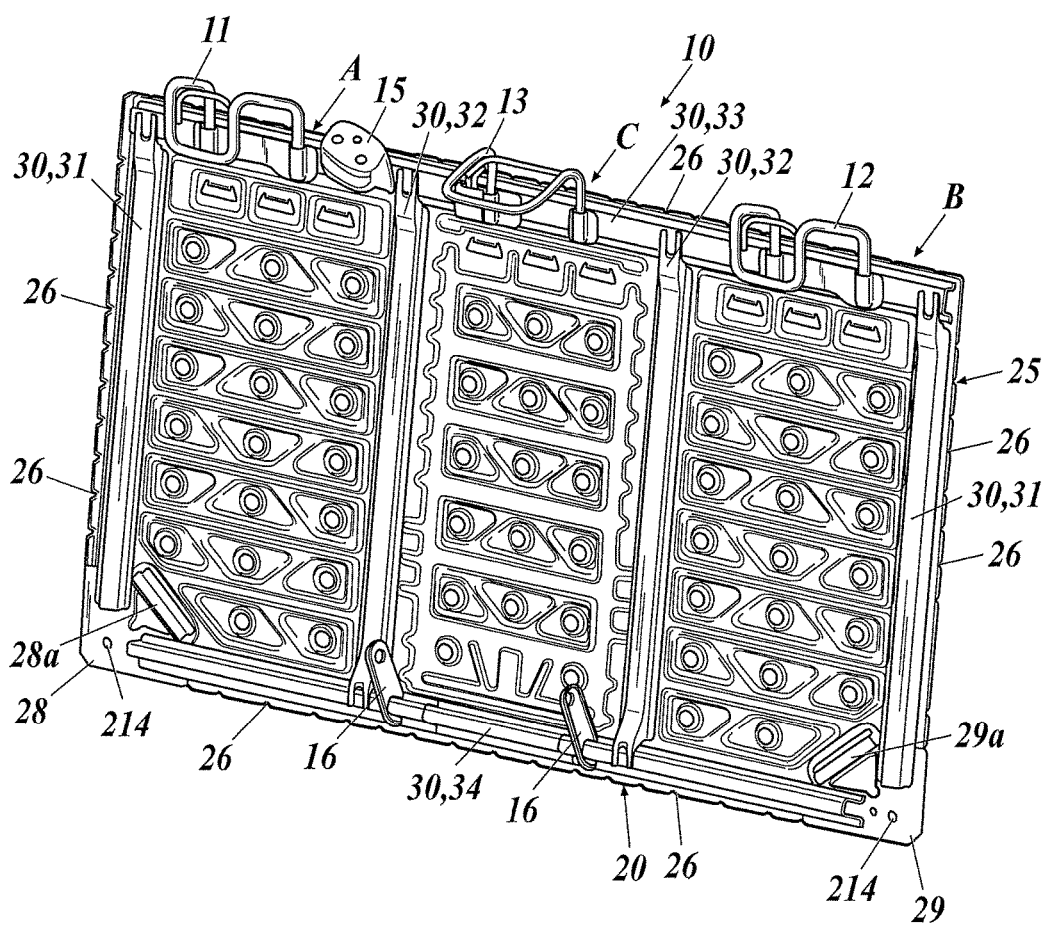
FIG. 2 is a front perspective view of the seat back frame.
Figure 3:
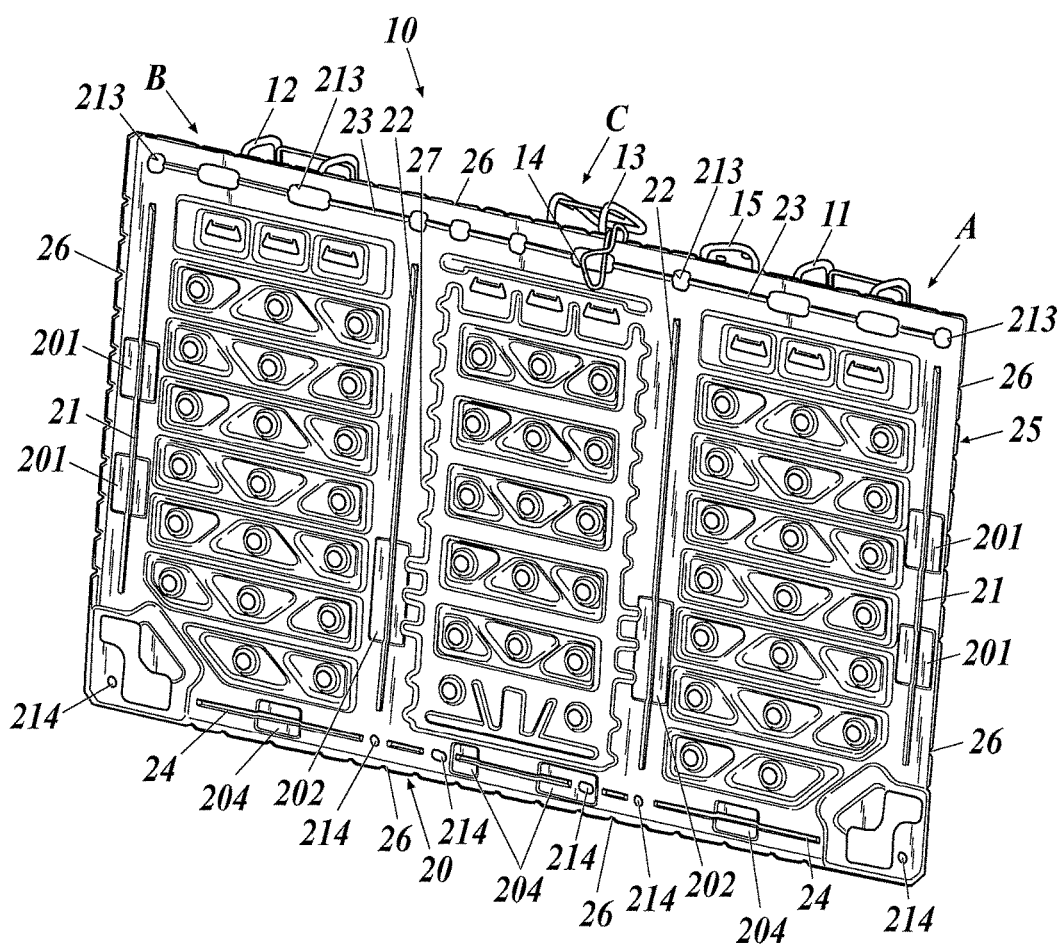
FIG. 3 is a rear perspective view of the seat back frame.
Figure 4:
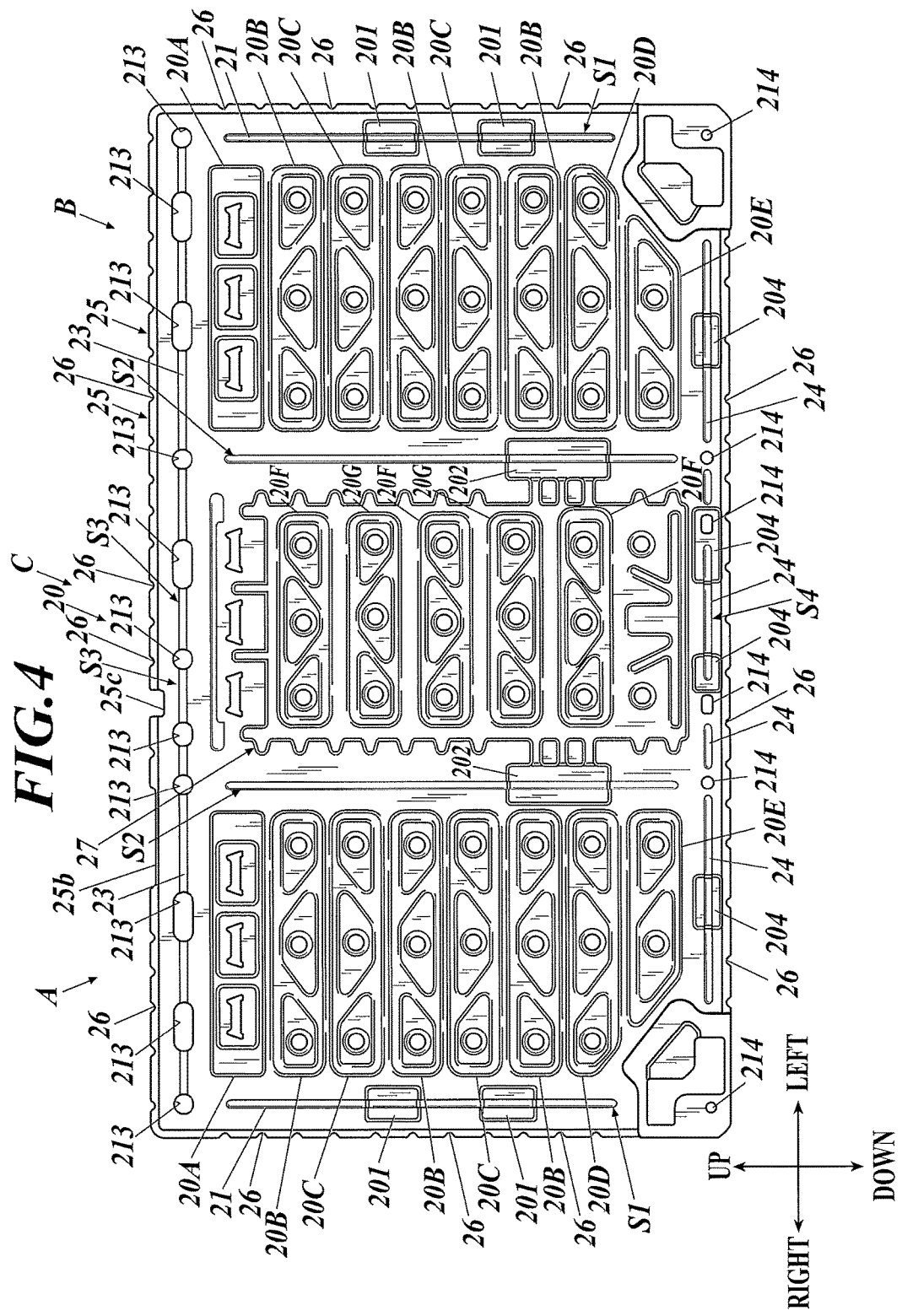
FIG. 4 is a front view of the front surface of a panel member.

The panel member 20 (also referred to as a pan frame) is a metal plate of steel, aluminum alloy, or the like, and is formed in a rectangular shape when viewed from the front as shown in FIGS. 2 to 4. The panel member 20 is mounted on the vehicle seat in such a manner that a direction along the long side thereof is along a left and right direction and a direction along the short side thereof is along the vertical direction.

The frame member 30 includes side frame members 31, middle frame members 32, an upper frame member 33, and a lower frame member 34. The side frame members 31 are respectively attached to left and right end portions of the front surface of the panel member 20 along the vertical direction. The middle frame members 32 are respectively attached to two positions at the center portion of the front surface of the panel member 20 along the vertical direction. The upper frame member 33 is provided along the left and right direction at an upper end portion on the front surface side of the panel member 20. The lower frame member 34 is provided along the left and right direction at a lower end portion on the front surface side of the panel member 20.

These frame members 31 to 34 are metal support columns of steel, aluminum alloy, or the like.

Upper end portions of the side frame members 31 and the middle frame members 32 are joined to the upper frame member 33 by laser welding, and lower end portions of the middle frame members 32 are joined to the lower frame member 34 by laser welding.

Note that the upper end portions of the side frame members 31 and the middle frame members 32 and the lower end portions of the middle frame members 32 respectively overlap and are welded to the upper frame member 33 and the lower frame member 34, and therefore are set to be thin.

In addition, reinforcing panels 28 and 29 for reinforcing corner portions of the panel member 20 are joined to lower end portions on the left and right sides of the panel member 20. The lower end portions of the side frame members 31 are joined to the reinforcing panels 28 and 29 by laser welding without reaching the lower frame member 34. Further, both end portions of the lower frame member 34 are also joined to the reinforcing panels 28 and 29 by laser welding.

Note that there is a joining space for joining the reinforcing panels 28 and 29 at the lower end portions on the left and right sides of the panel member 20, and the joining space is formed in a shape following the shapes of the reinforcing panels 28 and 29.

The laser welding of the present embodiment is performed from the rear surface side of the panel member 20. The laser welding is also performed from the rear side of the panel member 20 in the case where necessary components such as a headrest frame to be described later are joined to the upper frame member 33 and the lower frame member 34.

Note that the reinforcing panels 28 and 29 are panel members extending from corner portions at the lower end portions on the left and right sides of the panel member 20 to the inside of the side frame members 31 and the lower frame member 34, and are set to be thicker than the panel member 20. Reinforcing brackets 28a and 29a are joined to the extending portions of the reinforcing panels 28 and 29 extending to the inside of the side frame members 31 and the lower frame member 34. The reinforcing brackets 28a and 29a are disposed obliquely along the shape of outer end portions of sections 20D and 20E of a reinforcement structure that will be described later, and project forward.

In addition, holes corresponding to holes 214 are respectively defined in the reinforcing panels 28 and 29 and projection nuts (not shown) for attaching the seat back frame 10 to the vehicle body are joined to positions corresponding to the holes by projection junction.

Headrest frames 11, 12, and 13, a striker 14, and a seat belt attachment portion 15 are joined to the upper frame member 33 by laser welding as necessary components.

The headrest frame 11 constitutes the framework of a right headrest 4a corresponding to the right seat back 3a. The right headrest 4a is configured by providing a cushion material to the headrest frame 11 and further covering the cushion material with a surface material.

The headrest frame 12 constitutes the framework of a left headrest 4b corresponding to the left seat back 3b. The left headrest 4b is configured by providing a cushion material to the headrest frame 12 and further covering the cushion material with a surface material.

The headrest frame 13 constitutes the framework of a center headrest 4c corresponding to the center seat back 3c. The center headrest 4c is configured by providing a cushion material to the headrest frame 13 and further covering the cushion material with a surface material.

The striker 14 is held by a locking mechanism (not shown) provided in the vehicle main body of the automobile, and thereby the posture of the seat back 3 is retained. The striker 14 is formed so as to extend from the upper frame member 33 to a position where the locking mechanism is provided. Note that in the present embodiment, the striker 14 extends rearward from the upper frame member 33, passing above the seat back frame 10.

The seat belt attachment portion 15 is provided for attaching a seat belt for an occupant sitting in the central row of the vehicle seat 1, and is formed so as to protrude upward and forward from the upper frame member 33.

Note that although the headrest frames 11, 12, and 13 each employ a configuration in which a headrest pillar serving as a lower end portion thereof is fixed to the upper frame member 33, for example, a configuration in which the height thereof can be adjusted along the headrest pillar may be employed. In such a case, although not shown in the drawings, it is assumed that support portions for supporting holding portions that hold the headrest frames 11, 12, and 13 in a height-adjustable manner are welded to the upper frame member 33.

A pair of armrest brackets 16 is joined to the lower frame member 34 by laser welding as necessary components. As described above, the center seat back 3c can be inclined forward about the rotation axis provided at the lower end portion thereof and functions as an armrest that can be used from the left and right seat backs 3a and 3b. The pair of armrest brackets 16 rotatably supports such a center seat back (armrest) 3c.

Spaces S1 to S4 for joining the frame members 31 to 34 by laser welding are secured on the panel member 20 around sections 20A to 20G of the reinforcement structure that will be described later. That is, spaces S1 for joining the side frame members 31 are secured along the vertical direction at both left and right end portions of the front surface of the panel member 20, and spaces S2 for joining the middle frame members 32 are secured at two positions at the center portion of the front surface of the panel member 20 along the vertical direction. In addition, a space S3 for joining the upper frame member 33 is secured at an upper end portion on the front surface side of the panel member 20 along the left and right direction, and a space S4 for joining the lower frame member 34 is secured at a lower end portion on the front surface side of the panel member 20 along the left and right direction.

Also, each of the frame members 31 to 34 is constituted by a hat-shaped frame member including a web portion W and a flange portion F integrally formed with the web portion W and joined to the panel member 20. The web portion W is substantially concave in cross section (or substantially in an inverted U shape, a C shape, a U shape, or the like in cross section) so as to form a closed cross-sectional shape with the panel member 20.

The flange portions F of the frame members 31 to 34 are joined to the respective spaces S1 to S4 of the panel member 20 by laser welding.

The panel member 20 is divided into three regions by the left and right side frame members 31 and the left and right middle frame members 32.

In other words, the panel member 20 has a right region A between the right side frame member 31 and the right middle frame member 32, a left region B between the left side frame member 31 and the left middle frame member 32, and a center region C between the right middle frame member 32 and the left middle frame member 32.

The regions A, B, and C on the panel member 20 correspond to regions for seating (right seat back 3a, left seat back 3b, and center seat back 3c, respectively) of the seat back 3 itself.

In the right region A of the panel member 20, sections 20A, 20B, 20C, 20D, and 20E of the reinforcement structure are arranged in the vertical direction. That is, the sections 20A, 20B, 20C, 20B, 20C, 20B, 20D, and 20E are arranged in this order from the top to the bottom.

The sections 20A to 20E of the reinforcement structure are portions of the panel member 20 at which the panel member 20 are formed in shapes uneven in the front and rear direction, and a plurality of uneven portions is formed in each of the sections. As a result of forming the plurality of uneven portions in this way, each section includes beads corresponding to the front view shape of the plurality of uneven portions, and thus the rigidity thereof can be increased.

Note that the bead is a (rail-like) elongated protrusion structure formed so as to bulge forward from the front surface of the panel member 20. If the metal plate constituting the panel member 20 is flat, deformation such as warping or bending tends to occur. However, by forming the elongated protruding bead by plastic working, the rigidity of the panel member 20 can be increased such that deformation of the panel member 20 is less likely to occur.

As shown in FIGS. 2 to 4, the section 20A of the reinforcement structure is a rectangle that is long in the left and right direction and has three uneven portions that are formed in rectangular shapes in front view.

The section 20B of the reinforcement structure is a rectangle that is long in the left and right direction and has two uneven portions formed in right-angled trapezoidal shapes in front view (that is, a trapezoid having two right-angled portions) and an uneven portion formed in an isosceles trapezoidal shape in front view.

The section 20C of the reinforcement structure is a rectangle that is long in the left and right direction and has uneven portions vertically symmetrical to the uneven portions formed in the section 20B of the reinforcement structure. That is, the section 20C has two uneven portions formed in right-angled trapezoidal shapes in front view and an uneven portion formed in an isosceles trapezoidal shape in front view The section 20D of the reinforcement structure is a pentagon that is long in the left and right direction (a pentagon having three right angles) and has an uneven portion formed in a right-angled trapezoidal shape in front view, an uneven portion formed in a parallelogram shape in front view, and an uneven portion formed in an isosceles trapezoidal shape in front view.

The section 20E of the reinforcement structure is a right-angled trapezoid that is long in the left and right direction and has an uneven portion formed in a right-angled trapezoidal shape in front view and an uneven portion formed in a parallelogram shape in front view.

A through hole is formed in the center portion of each of the uneven portions as described above to reduce the weight of the panel member 20. In addition, the through hole may be used for passing wires for, for example, electric wiring, or for other purposes.

In the left region B of the panel member 20, sections 20A, 20B, 20C, 20D, and 20E of the reinforcement structure are arranged in the vertical direction as shown in FIGS. 2 to 4. That is, the sections 20A, 20B, 20C, 20B, 20C, 20B, 20D, and 20E are arranged in this order from the top to the bottom.

The sections 20A to 20C are the same as the sections 20A to 20C of the reinforcement structure formed in the right region A described above.

The section 20D is in a state in which the section 20D of the reinforcement structure formed in the right region A described above is inverted in the left and right direction (a state of line symmetry with respect to the axis extending in the vertical direction).

The section 20E is in a state in which the section 20E of the reinforcement structure formed in the right region A described above is inverted in the left and right direction (a state of line symmetry with respect to the axis extending in the vertical direction).

As shown in FIGS. 2 to 4, the center region C of the panel member 20 is constituted by the sections 20F and 20G of the reinforcement structure arranged in the vertical direction.

The section 20F of the reinforcement structure is a rectangle that is long in the left and right direction and has two uneven portions formed in right-angled trapezoidal shapes in front view (that is, a trapezoid having two right-angled portions) and an uneven portion formed in an isosceles trapezoidal shape in front view.

The section 20G of the reinforcement structure is a rectangle that is long in the left and right direction and has uneven portions vertically symmetrical to the uneven portions formed in the section 20F of the reinforcement structure. That is, the section 20G of the reinforcement structure has two uneven portions formed in right-angled trapezoidal shapes in front view and an uneven portion formed in an isosceles trapezoidal shape in front view.

As shown in FIGS. 2 to 7, the panel member 20 has an outer peripheral flange 25 formed by bending forward an outer peripheral portion of the panel member 20. That is, the panel member 20 is formed in a tray shape by bending the outer peripheral portion thereof as described above.

Figure 5:
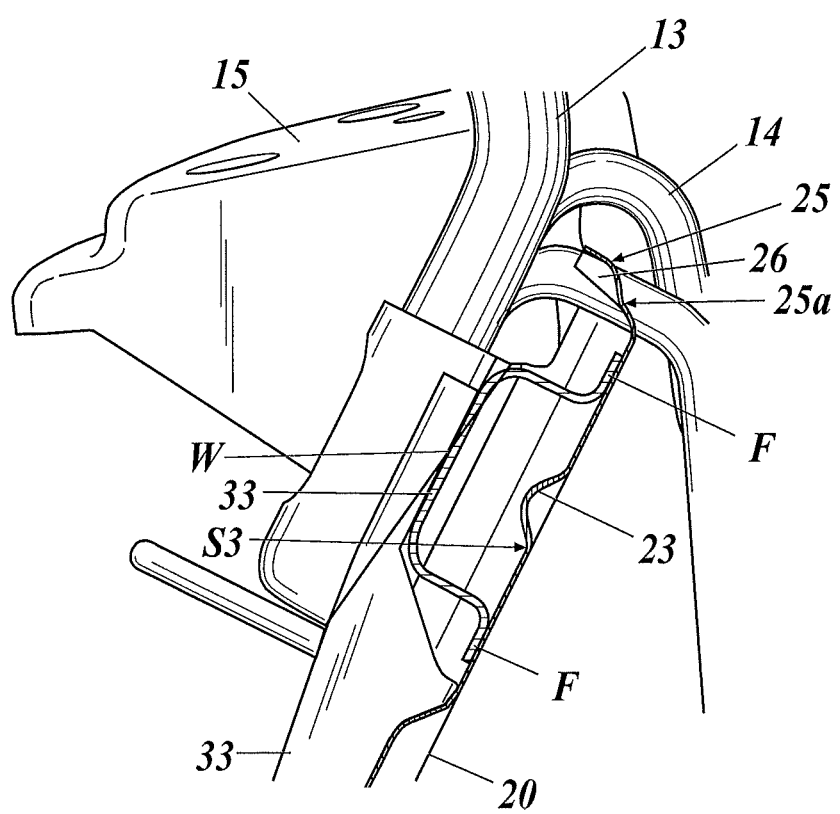
FIG. 5 is an enlarged sectional view of the vicinity of an upper end portion of the seat back frame.

As shown in FIG. 5, the outer peripheral flange 25 is formed such that the outer peripheral portion of the panel member 20 is bent in a stepwise manner. That is, the outer peripheral flange 25 is formed not to be simply curved but to include a step portion 25a when being formed by plastic working of the panel member 20.

The outer peripheral flange 25 is formed to be continuous at least at a corner portion of the panel member 20. That is, the outer peripheral flange 25 is formed along the outer peripheral portion of the panel member 20, and even if there is a discontinuous portion of the outer peripheral flange 25, for example, in the middle of the outer peripheral portion, the outer peripheral flange 25 is continuous at least at the corner portion of the panel member 20.

As shown in FIGS. 2 to 4, a plurality of outer peripheral beads 26 is formed on the outer peripheral flange 25 and arranged at intervals in the circumferential direction of the panel member 20. The plurality of outer peripheral beads 26 is positioned in the vicinity of beads 21 to 24 (described later) formed to face the frame members 31 to 34, and has shapes different from the beads 21 to 24.

In addition, the plurality of outer peripheral beads 26 is arranged at substantially equal intervals with respect to the outer peripheral flange 25 when the panel member 20 is viewed for each side.

However, since the striker 14 and the seat belt attachment portion 15 attached to the upper frame member 33 protrude upward and rearward as described above, the striker 14 and the seat belt attachment portion 15 sometimes interfere with the outer peripheral flange 25 and cause a problem. Therefore, the outer peripheral flange 25 of an upper edge of the panel member 20 is formed in a state of being partially cut out at positions where the striker 14 and the seat belt attachment portion 15 are provided. In this way, the partially cut-out portions of the outer peripheral flange 25 are defined as discontinuous portions 25b and 25c, and the striker 14 and the seat belt attachment portion 15 are provided at the discontinuous portions 25b and 25c.

The plurality of outer peripheral beads 26 is formed on the outer peripheral flange 25 so as to extend along the front and rear direction. That is, the plurality of outer peripheral beads 26 is formed along the bending direction of the outer peripheral flange 25 formed so as to be bent forward.

Figure 6:
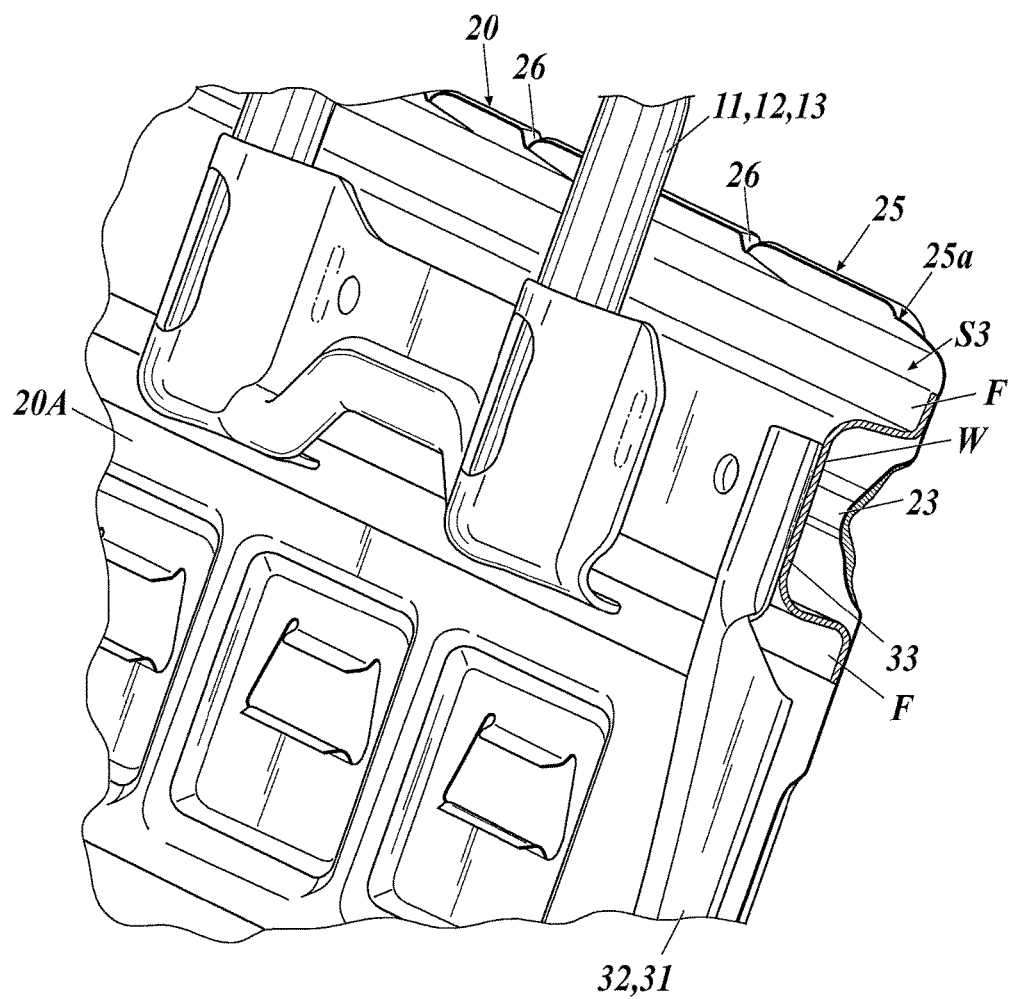
FIG. 6 is an enlarged perspective view of the vicinity of the upper end portion of the seat back frame.
Figure 7:
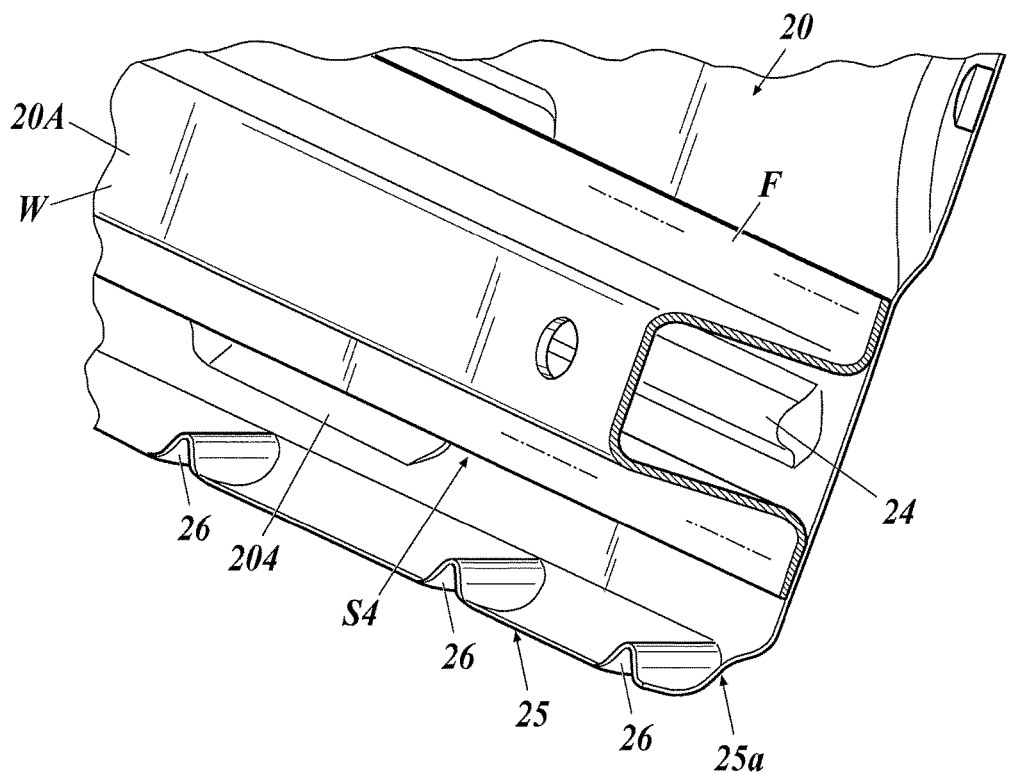
FIG. 7 is an enlarged perspective view of the vicinity of a lower end portion of the seat back frame.
Figure 8:
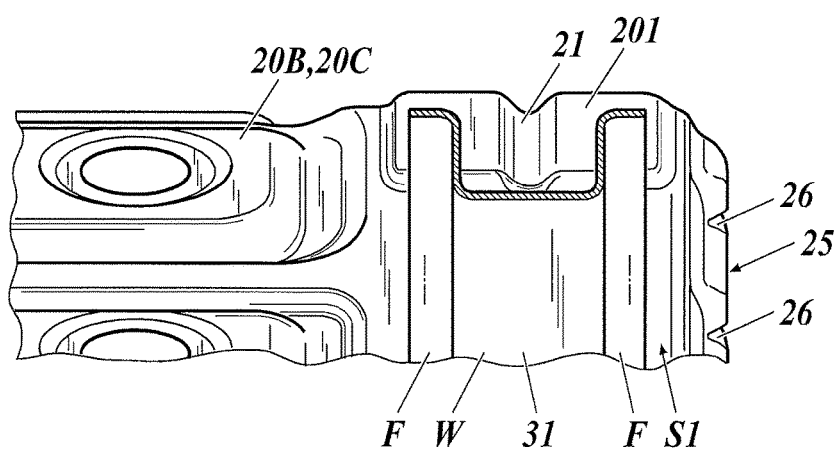
FIG. 8 is an enlarged perspective view of the vicinity of a side end portion of the seat back frame.
Figure 9:
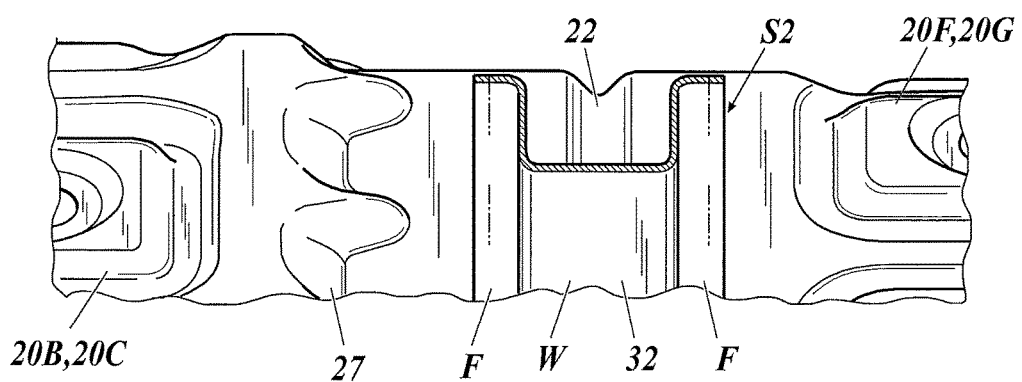
FIG. 9 is an enlarged perspective view of the vicinity of a center portion of the seat back frame.

In addition, as shown in FIGS. 5 to 7, the plurality of outer peripheral beads 26 is formed in a region from the vicinity of the step portion 25a of the outer peripheral flange 25 to the distal end of the outer peripheral flange 25 in the bending direction.

The outer peripheral beads 26 of the outer peripheral flange 25 are each formed such that a portion of the outer peripheral flange 25 located closer to the distal end than the step portion 25a is recessed toward the center of the panel member 20 in front view (for example, in a U shape or a V shape in front view).

As shown in FIGS. 2 and 3, the side frame members 31, the upper frame member 33, and the lower frame member 34 among the frame members 31 to 34 joined to the panel member 20 are disposed in the vicinity of and along the outer peripheral flange 25. That is, the side frame members 31, the upper frame member 33, and the lower frame member 34 are provided in a frame shape along the four sides of the panel member 20 formed in a rectangular shape.

Further, the middle frame members 32 are joined to portions of the panel member 20 corresponding to positions between the rows of the seat back 3. That is, the middle frame members 32 are provided so as to be positioned between the right seat back 3a and the center seat back 3c and between the left seat back 3b and the center seat back 3c of the seat back 3. More specifically, the middle frame members 32 are joined to spaces respectively secured between the right region A and the center region C and between the left region B and the center region C of the panel member 20.

In addition, the frame members 31 to 34 are joined to the surface of the panel member 20 on the side toward which the outer peripheral flange 25 is bent (the front surface of the panel member 20). That is, the direction in which the frame members 31 to 34 project and the bending direction of the outer peripheral flange 25 are aligned, and thus the size increase of the seat back frame 10 in the front and rear direction can be suppressed.

Note that, as shown in FIG. 5, the web portions W of the respective frame members 31 to 34 project forward beyond the distal end portion of the outer peripheral flange 25 in the bending direction. Various necessary components such as the above-described headrest frames 11, 12, and 13 are attached to the front surface of the web portions W of the upper frame member 33 and the lower frame member 34. Therefore, if the web portion W projects forward, necessary components such as the headrest frames 11, 12, and 13 hardly interfere with the outer peripheral flange 25 of the panel member 20.

As shown in FIGS. 5 to 9, the panel member 20 includes first to fourth beads 21 to 24 formed at positions facing the frame members 31 to 34. That is, two first beads 21 are formed in correspondence with the left and right side frame members 31, and two second beads 22 are formed in correspondence with the left and right middle frame members 32. In addition, one third bead 23 is formed in correspondence with the upper frame member 33, and one fourth bead 24 is formed in correspondence with the lower frame member 34.

More specifically, each of the beads 21 to 24 is formed along the longitudinal direction of each of the frame members 31 to 34.

The first beads 21, the third bead 23, and the fourth bead 24 are respectively formed in the aforementioned spaces S1, S3, and S4 along the outer peripheral portion which is the four sides of the panel member 20. That is, the first beads 21, the third bead 23, and the fourth bead 24 are disposed in the vicinity of and along the outer peripheral portion (outer peripheral flange 25) of the panel member 20 together with the side frame members 31, the upper frame member 33, and the lower frame member 34.

In addition, the second beads 22 are formed in the aforementioned spaces S2 respectively secured between the right region A and the center region C and between the left region B and the center region C of the panel member 20.

The first to fourth beads 21 to 24 project to the side of the web portion W (that is, the front side) of the frame members 31 to 34 which are hat-shaped frame members.

In addition, the first to fourth beads 21 to 24 are each formed along the longitudinal direction of corresponding one of the frame members 31 to 34. However, the present invention is not limited to this configuration, and it suffices that the first to fourth beads 21 to 24 are formed along the surface direction of the panel member 20. The first to fourth beads 21 to 24 may be each formed to be short in a direction perpendicular to the longitudinal direction of the corresponding one of the frame members 31 to 34 in a plural number, or may be formed in a zigzag shape.

As shown in FIGS. 3, 4, 7, and 8, the panel member 20 is formed so as to include no-junction portions 201, 202, and 204 which are formed to be recessed with respect to the side frame members 31, the middle frame members 32, and the lower frame member 34 among the frame members 31 to 34 and to which flange portions F of the frame members 31, 32, and 34 are not joined.

The no-junction portions 201 are formed at two positions in the vicinity of the center portion in the vertical direction of the space S1, to which the side frame members 31 are joined, with an interval therebetween in the vertical direction. That is, two no-junction portions 201 are provided at each of the left and right end portions of the panel member 20.

The no-junction portions 202 are formed at positions lower than the center portion in the vertical direction of the space S2 to which the middle frame members 32 are joined. That is, one no-junction portion 202 is provided on each of the left and right sides of the center region C of the panel member 20.

The no-junction portions 204 are formed at one position on the lower side of the right region A, one position on the lower side of the left region B, and two positions on the lower side of the center region C in the space S4 to which the lower frame member 34 is joined. The no-junction portions 204 formed at the two positions on the lower side of the center region C are set so as to have different sizes.

Since the frame members 31, 32, and 34 are not joined to portions where the no-junction portions 201, 202, and 204 are formed, the rigidity of the portions is set to be lower than that of the other portions to which the frame members 31, 32, and 34 are joined. Such no-junction portions 201, 202, and 204 become starting points of deformation of the panel member 20, for example, when an article such as baggage collides with the seat back frame 10 and an impact load is applied thereto. With this configuration, for example, it is possible to easily absorb the impact when baggage stored in a cargo room collides with the seat back 3 with a strong force.

The first beads 21, the second beads 22, and the fourth bead 24 formed at positions facing the side frame members 31, the middle frame members 32, and the lower frame member 34 are formed so as to extend through the no-junction portions 201, 202, and 204 respectively.

In other words, the no-junction portions 201, 202, and 204 can also be viewed as being provided on both sides of the first beads 21, the second beads 22, and the fourth bead 24 formed in the respective spaces S1, S2, and S4.

In the vicinity of the second beads 22 of the panel member 20, another bead 27 having a different shape from the beads 22 is formed.

The other bead 27 is provided so as to surround the periphery of the sections 20F and 20G of the reinforcement structure in the center region C of the panel member 20, and is formed in a corrugated shape meandering so as to be closer to or away from the sections 20F and 20G of the reinforcement structure.

As shown in FIGS. 3 and 4, a part of the other bead (corrugated bead) 27 formed in such a corrugated shape extends toward the no-junction portions 202 provided on the left and right sides of the center region C of the panel member 20 and is in a state of being integrated with the no-junction portions 202.

As shown in FIGS. 3 and 4, the panel member 20 has a plurality of holes 213 and 214 defined at positions corresponding to the respective frame members 31 to 34.

The plurality of holes 213 is defined at an upper end portion of the panel member 20 with intervals therebetween in the left and right direction, and includes a plurality of circular holes and a plurality of elongated holes.

The plurality of holes 214 is defined at a lower end portion of the panel member 20 with intervals therebetween in the left and right direction, and includes a plurality of circular holes and a plurality of elongated holes.

The plurality of holes 213 and 214 is defined for performing laser welding from the rear side of the panel member 20 in the case of joining members such as the headrest frame to the upper frame member 33 and the lower frame member 34. Therefore, a member such as a headrest frame is provided at a position where the plurality of holes 213 and 214 is defined.

The plurality of holes 213 and 214 is defined for joining necessary components such as the headrest frames 11, 12, and 13 to the upper frame member 33 and the lower frame member 34 by performing laser welding from the rear side of the panel member 20.

Among the plurality of holes 213 and 214, the plurality of elongated holes is preferable because these holes can secure a wide range in which junction can be formed by laser welding.

The third bead 23 and the fourth bead 24 are formed to extend between adjacent holes 213 and between adjacent holes 214 out of the plurality of holes 213 and 214. In other words, even in the case where the plurality of holes 213 and 214 for joining necessary components such as the headrest frames 11, 12, and 13 is defined on the panel member 20, the plurality of holes 213 and 214 can be interconnected by the respective beads 23 and 24.

In addition, even if the plurality of holes 213 and 214 is thus defined, since the upper frame member 33 and the lower frame member 34 are joined to the spaces S3 and S4 where the plurality of holes 213 and 214 is defined, the rigidity required for the panel member 20 can be maintained.

Further, since the outer peripheral flange 25 is provided on the outer peripheral portion of the panel member 20 and is provided with the plurality of outer peripheral beads 26 formed thereon, the outer peripheral flange 25 can contribute to maintaining the rigidity required for the panel member 20.

In addition, similarly, the outer peripheral flange 25 of an upper edge of the panel member 20 includes the discontinuous portions 25b and 25c, in which the outer peripheral flange 25 is partially cut out, at positions where the striker 14 and the seat belt attachment portion 15 are provided. Since the upper frame member 33 and the third bead 23 are provided along the outer peripheral flange 25 of the upper edge of the panel member 20, the outer peripheral flange 25 can contribute to maintaining the rigidity required for the panel member 20 even in the case where the outer peripheral flange 25 includes the discontinuous portions 25b and 25c as described above.

In addition, as shown in FIG. 4, the plurality of holes 213 and 214 includes holes 213 and 214 defined at positions where extension lines of the beads 21 to 24, which are arranged in directions perpendicular to one another among the beads 21 to 24, intersect with one another.

That is, the holes 213 and 214 are respectively defined at positions where the extension lines of the first beads 21 intersect with the extension lines of the third bead 23 and the fourth bead 24 and at positions where the extension lines of the second beads 22 intersect with the extension lines of the third bead 23 and the fourth bead 24. As described above, portions where the frame members 31 to 34 overlap one another, or projection nuts provided on the reinforcing panels 28 and 29 are present at the positions where the extension lines of the beads 21 to 24 intersect with one another. More specifically, the positions where the extension lines of the beads 21 to 24 intersect with one another are positions where welding of members is required, and since the holes 213 and 214 are defined for welding, it is necessary to improve the rigidity at the positions. Therefore, the beads 21 to 24 are formed such that the extension lines of the beads 21 to 24 intersect with each other.

Note that although the seat back frame 10 of the present embodiment constitutes the seat backs 3a, 3b, and 3c of a plurality of rows, the present invention is not limited to this. For example, a seat back frame divided to the left and right at a ratio of 6:4 may be employed, or a seat back divided at a ratio of 5:5 may be employed. Further, the configuration of the seat back frame 10 may be applied to a front seat instead of a rear seat.

According to the present embodiment as described above, the outer peripheral flange 25 formed by bending the outer peripheral portion of the panel member 20 is provided with the plurality of outer peripheral beads 26 arranged at intervals in the circumferential direction of the panel member 20. It is thus possible to synergistically improve the rigidity of the outer peripheral portion of the panel member 20 by both of the outer peripheral flange 25 and the plurality of outer peripheral beads 26, and consequently, it is possible to improve the rigidity of the seat back frame 10.

Since the outer peripheral flange 25 is formed so as to be continuous at least at the corner portion of the panel member 20, the rigidity of the outer peripheral portion of the panel member 20 can be further improved around the corner portion of the panel member 20.

Since the outer peripheral flange 25 is formed by bending the outer peripheral portion of the panel member 20 in a stepwise manner and thus includes the step portion 25a, the rigidity of the outer peripheral portion of the panel member 20 can be further improved.

In addition, since the plurality of outer peripheral beads 26 is disposed at substantially equal intervals on the outer peripheral flange 50, the rigidity of the portions of the outer peripheral flange 25 where the plurality of outer peripheral beads 26 is formed can be improved substantially uniformly.

In addition, since the frame members 31 to 34 are arranged in the vicinity of and along the outer peripheral flange 25, the rigidity of the outer peripheral portion of the panel member 20 can be further increased by the frame members 31 to 34.

In addition, since the frame members 31 to 34 are joined to the surface (front surface) of the panel member 20 on the side toward which the outer peripheral flange 25 is bent, the rigidity of the panel member 20 can be improved while an increase in the size of the panel member 20 at portions to which the frame members 31 to 34 are joined is suppressed.

In addition, since the first beads 21, the third bead 23, and the fourth bead 24 are formed on the panel member 20 in the vicinity of and along the outer peripheral flange 25, the rigidity of the seat back frame 10 can be improved synergistically by the outer peripheral flange 25, the frame members 31 to 34, and the beads 21, 23 and 24.

In addition, since at least one of the upper frame member 33 and the third bead 23 is disposed along the discontinuous portions 25b and 25c, the rigidity required for the outer peripheral portion of the panel member 20 can be ensured even in the case where the discontinuous portions 25b and 25c of the outer peripheral flange 25 are defined in the outer peripheral portion of the panel member 20 by omitting the outer peripheral flange 25.

In addition, since the panel member 20 can be reinforced by the frame members 31 to 34 and the panel member 20 can be reinforced by the beads 21 to 24, the rigidity of the seat back frame 10 can be further improved by the outer peripheral flange 25, the frame members 31 to 34, and the beads 21 to 24. Since the rigidity of the seat back frame 10 can be improved in this manner, it is possible to suppress noise generated due to lack of rigidity and noise caused by vibration generated in a running vehicle.

In addition, since the frame members 31 to 34 are each formed of a hat-shaped frame member including the flange portion F, the frame members 31 to 34 can be easily joined to the panel member 20, and the accuracy of the junction can be improved. Therefore, it is possible to improve the reliability of joining the frame members 31 to 34 to the panel member 20.

In addition, since the beads 21 to 24 project to the side of the web portion W of the frame members 31 to 34, the rigidity can be improved while the portions to which the frame members 31 to 34 are joined is miniaturized.

It should be considered that the embodiment disclosed this time is an example in all respects and is not restrictive. The scope of the present invention is not limited to the above description and is indicated by the claims, and it is intended that all modifications within meaning and scope equivalent to the claims are included.

This application claims priority from Japanese Patent Application No. 2017-056951 filed on Mar. 23, 2017, the contents of which are incorporated herein by reference in their entirety.

What is claimed is:

1. A vehicle seat, comprising:
a seat cushion;
a seat back comprising a reinforcement structure for a seat back frame; and
a head rest, wherein the reinforcement structure comprises:
a panel member; and
a frame member joined to the panel member,
wherein the panel member includes an outer peripheral flange that is composed of a bent outer peripheral portion of the panel member, and
wherein the outer peripheral flange includes a plurality of outer peripheral first beads, the plurality of first beads each being recessed toward a center of the panel member in a front view, and being arranged at intervals in a circumferential direction of the panel member.

2. The vehicle seat according to claim 1,
wherein the outer peripheral flange is formed to be continuous at least at a corner portion of the panel member.

3. The vehicle seat according to claim 1,
wherein the outer peripheral flange is composed of the outer peripheral portion of the panel member which is bent in a stepwise manner.

4. The vehicle seat according to claim 1,
wherein the plurality of outer peripheral first beads is arranged at substantially equal intervals with respect to the outer peripheral flange.

5. The vehicle seat according to claim 1,
wherein the frame member is disposed in a vicinity of the outer peripheral flange and along the outer peripheral flange.

6. The vehicle seat according to claim 1,
wherein the frame member is joined to a surface of the panel member on a side toward which the outer peripheral flange is bent.

7. The vehicle seat according to claim 1,
wherein a second bead is formed on the panel member in a vicinity of the outer peripheral flange and along the outer peripheral flange.

8. The vehicle seat according to claim 7,
wherein the frame member is formed as a hat-shaped frame member including a web portion and a flange portion, the web portion being substantially concave in cross section so as to form a closed sectional shape with the panel member, the flange portion being integrally formed with the web portion and joined to the panel member, and
the second bead is formed at a position, on the panel member, facing the web portion of the frame member.

9. The vehicle seat according to claim 8,
wherein the second bead protrudes toward a web portion side of the frame member.

10. The vehicle seat according to claim 1, wherein each of the plurality of outer peripheral first beads has a U shape or a V shape in the front view.

11. The vehicle seat according to claim 5,
wherein the frame member is disposed in a frame shape at four sides of the panel member along the outer peripheral flange, and
wherein the frame member is further disposed vertically and individually in a right part and in a left part of the panel member.

12. The vehicle seat according to claim 5,
wherein the frame member is disposed in a frame shape at four sides of the panel member along the outer peripheral flange, and
wherein the frame member is further disposed at at least one of four corners of the panel member in an oblique direction with respect to the frame shape.

13. A vehicle seat, comprising:
a seat cushion;
a seat back comprising a reinforcement structure for a seat back frame; and
a head rest, wherein the reinforcement structure comprises:
a panel member; and
a frame member joined to the panel member,
wherein the panel member includes an outer peripheral flange that is composed of a bent outer peripheral portion of the panel member,
wherein the outer peripheral flange includes a plurality of outer peripheral first beads that is arranged at intervals in a circumferential direction of the panel member,
wherein a discontinuous portion of the outer peripheral flange in which the outer peripheral flange is omitted is provided on an upper part of the outer peripheral portion of the panel member,
wherein the reinforcement structure further comprises a seat belt attachment portion disposed at the discontinuous portion, and
wherein each of the plurality of outer peripheral first beads is recessed toward a center of the panel member in a front view.

14. The vehicle seat according to claim 13,
wherein the frame member is disposed in a vicinity of the outer peripheral flange and along the outer peripheral flange.

15. The vehicle seat according to claim 13,
wherein a second bead is formed on the panel member in a vicinity of the outer peripheral flange and along the outer peripheral flange.

16. The vehicle seat according to claim 15,
wherein the frame member is formed as a hat-shaped frame member including a web portion and a flange portion, the web portion being substantially concave in cross section so as to form a closed sectional shape with the panel member, the flange portion being integrally formed with the web portion and joined to the panel member, and
the second bead is formed at a position, on the panel member, facing the web portion of the frame member.

17. The vehicle seat according to claim 15,
wherein the second bead protrudes toward a web portion side of the frame member.

18. The vehicle seat according to claim 14,
wherein the frame member is disposed in a rectangular shape along the outer peripheral flange at four sides of the panel member, and
wherein the frame member is further disposed at at least one of four corners of the panel member in an oblique direction with respect to the rectangular shape.

* * * * *